(12) United States Patent
Lim et al.

(10) Patent No.: US 10,336,904 B2
(45) Date of Patent: Jul. 2, 2019

(54) COMPOSITION OF A BLEND OF POLYAMIDE AND POLYESTER RESINS

(71) Applicant: RHODIA OPERATIONS, Paris (FR)

(72) Inventors: Mok-Keun Lim, Seoul (KR); Kwang-Sang Lee, Seoul (KR); Yeong-Chool Yu, Seoul (KR)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 15/416,660

(22) Filed: Jan. 26, 2017

(65) Prior Publication Data

US 2017/0145212 A1    May 25, 2017

Related U.S. Application Data

(63) Continuation of application No. 13/379,228, filed as application No. PCT/EP2010/058594 on Jun. 18, 2010, now abandoned.

(30) Foreign Application Priority Data

Jun. 19, 2009  (FR) ..................... 09 54138
Jun. 30, 2009  (FR) ..................... 09 54438
Apr. 6, 2010   (FR) ..................... 10 52563

(51) Int. Cl.
    *C08L 63/00*   (2006.01)
    *C08L 67/00*   (2006.01)
    *C08L 67/02*   (2006.01)
    *C08L 77/00*   (2006.01)
    *C08L 77/02*   (2006.01)
    *C08L 77/06*   (2006.01)

(52) U.S. Cl.
    CPC ............ *C08L 77/06* (2013.01); *C08L 67/00* (2013.01); *C08L 67/02* (2013.01); *C08L 77/00* (2013.01); *C08L 77/02* (2013.01); *C08L 63/00* (2013.01); *C08L 2201/02* (2013.01); *C08L 2205/03* (2013.01); *C08L 2205/08* (2013.01)

(58) Field of Classification Search
    None
    See application file for complete search history.

(56) References Cited

U.S. PATENT DOCUMENTS

| 6,531,530 B2 * | 3/2003 | Asano ............ C08K 5/34928 |
| | | 523/200 |
| 2005/0014875 A1 * | 1/2005 | Knop ............... C08K 5/523 |
| | | 524/126 |

FOREIGN PATENT DOCUMENTS

GB     2210623 A  *  6/1989

* cited by examiner

*Primary Examiner* — Ana L. Woodward
(74) *Attorney, Agent, or Firm* — Osha Liang LLP

(57) ABSTRACT

A resin blend composition of a polyamide resin and a polyester resin is described, which includes a polyamide resin, a polyester resin and an epoxy resin. The resin blend composition can have improved compatibility between the polyamide resin and the thermoplastic polyester resin, and therefore mechanical properties (strength, bending strength, elasticity, abrasion resistance, impact strength), chemical properties (solvent resistance), thermal resistance, dimensional stability, and paintability.

17 Claims, No Drawings

COMPOSITION OF A BLEND OF POLYAMIDE AND POLYESTER RESINS

The present invention relates to a composition of a blend of polyamide resin and of polyester resin with improved compatibility, and more particularly a composition of a blend with improved compatibility between the above two resins, which are generally known to be incompatible with one another.

Polyamide resin possesses better mechanical, chemical, and thermal properties and properties of adherence to paint, etc., and is therefore used in many areas. However, a polyamide resin has low dimensional stability and the mechanical properties of the polyamide resin decrease with absorption of water. Accordingly, there has been an attempt to improve the properties of the polyamide resin by mixing polyamide resin in the molten state with another thermoplastic resin (for example, a polyester resin) to form a mixture in the molten state. However, since a thermoplastic polyamide resin displays low compatibility with a thermoplastic polyester resin, a mixture formed only from the two resins has poor processability and properties.

Consequently, U.S. Pat. No. 4,150,674 describes the use of a lactam terpolymer as a compatibilizer when mixing a polyamide resin with a polyester resin and the use of the product thus obtained for fabrics. Moreover, U.S. Pat. No. 5,055,509 describes the introduction of arylphosphonyl nitride as compatibilizer. However, the effects of compatibilization of these compounds have not been clearly verified and the resultant products do not give the required properties.

U.S. Pat. Nos. 5,296,550, 5,475,058, the documents EP 664 320, EP 984 087, etc., describe a composition that improves the compatibility between the two resins by adding an olefin resin obtained by graft copolymerization of an ethylene type monomer (for example, styrene, methacrylate, etc.) with a monomer that has a glycidyl group (for example, glycidyl methacrylate, etc.). However, this composition has disadvantages such as reduced rigidity compared with the polyamide or polyester resins themselves.

C. C. Huang et al., Polymer, 1997, 38(7), 2135-2141 and C. C. Huang et al., Polymer, 1997, 38(17), 4287-4293, describe mixtures of PBT (poly(butylene terephthalate)) and PA66 (polyamide-6,6) polymers which make use of an epoxy resin of the bisphenol-A type in the solid state having an epoxy equivalent weight (EEW) of 2060 g/eq. J. An et al., Journal of Applied Polymer Science, 1996, 60, 1803-1810, describe blends of PET and PA-6 (polyamide-6) with various amounts of epoxy resin E-44 (EEW=210 g/eq). K. C. Chiou et al., Journal of Applied Polymer Science: Part B: Polymer Physics, 2000, 38, 23-33, employ a multifunctional epoxy resin (EEW=110 to 130 g/eq) as coupling agent for compatibilizing PA 6/PBT mixtures. However, when using an epoxy resin with a low epoxy equivalent weight in polymer blends, the processability and properties of the polymer blends are still unsatisfactory and require improvement.

Thus, the aim of the present invention is to propose a composition of a blend of a polyamide resin and of a polyester resin that has improved compatibility.

Another aim of the present invention is to propose a resin blend composition of a thermoplastic polyamide resin and of a thermoplastic polyester resin whose mechanical properties (properties of strength, bending strength, elasticity, abrasion resistance, impact strength), chemical properties (resistance to solvents), heat resistance, dimensional stability, combability, etc. are improved.

In order to achieve the above aims, the present invention proposes a resin blend composition of a polyamide resin and of a polyester resin with improved compatibility, which comprises a) a polyamide resin, b) a polyester resin and c) an epoxy resin.

More specifically, the composition according to the present invention is a composition of a blend of a polyamide resin and of a polyester resin displaying improved compatibility, which comprises at least:
a) from 1 to 98 wt. % of a thermoplastic polyamide resin;
b) from 1 to 98 wt. % of a thermoplastic polyester resin; and
c) from 0.01 to 10 wt. % of an epoxy resin having an epoxy equivalent weight (EEW) between 2100 and 6000 g/eq.

(a) Polyamide Resin

In one embodiment, the polyamide resin included in the composition of the present invention can be any thermoplastic polyamide rosin. Examples of a polyamide resin can comprise a polyamide-6 that can be obtained as products of ring-opening polymerization of lactams such as ε-caprolactam and ω-dodecalactam; polyamide polymers that can be obtained from amino acids such as aminocaproic acid, 11-aminoundecanoic acid and 12-aminododecanoic acid; aliphatic, cycloaliphatic or aromatic diamines such as ethylenediamine, tetramethylenediamine, hexamethylenediamine, undecamethyleniediamine, dodecamethylenediamine, 2,2,4-trimethylhexamethylenediamine, 2,4,4-trimethylhexamethylenediamine, 5-methylnonahexamethylenediamine, m-xylenediamine, p-xylenediamine, 1,3-bisaminomethylcyclohexane, 1,4-bisaminomethylcyclohexane, 1-amino-3-aminomethyl-3,5,5-trimthylcyclohexane, bis(4-aminocyclohexane)methane, bis(4-methyl-4-aminocyclohexyl)methane, 2,2-bis(4-aminocyclohexyl)propane, bis(aminopropyl)piperazine, aminoethylpiperidine, etc.; polyamide polymers that can be obtained from aliphatic, cycloaliphatic or aromatic dicarboxylic acids such as adipic acid, sebacic acid, azelaic acid, dodecanedioic acid, terephthalic acid, isophthalic acid, 2-chloroterephthalic acid, 2-methylterephthalic acid and 5-methylisophthalic acid; and copolymers of polyamide resins, and the latter can be used alone or as a combination of two or more types.

In certain embodiments, examples of the polyamide resin can comprise polyamide-6, polyamide-66, polyamide-610, polyamide-11, polyamide-12, polyterephthalamide, polyisophthalamide, and polyaramids.

The general structural formulas of some of these resins are represented as follows:
<Polyamide-6>

<Polyamide-66>

<Polyamide-66/6>

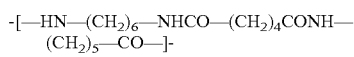

The polyamide matrix can notably be a polymer comprising branched or hyperbranched star or H macromolecular chains, and possibly linear macromolecular chains. The polymers comprising said star or H macromolecular chains are described for example in documents FR2743077, FR2779730, U.S. Pat. No. 5,959,069, EP0632703, EP0682057 and EP0832149.

According to another particular embodiment of the invention, the polyamide matrix of the invention can be a polymer of the random tree type, preferably a copolyamide having a random tree structure. These copolyamides of random tree structure as well as the method of production thereof are notably described in document WO99/03909. The matrix of the invention can also be a composition comprising a linear thermoplastic polymer and a star, H and/or tree thermoplastic polymer as described above. The matrix of the invention can also comprise a hyperbranched copolyamide of the type of those described in document WO 00/68298. The composition of the invention can also comprise any combination of linear, star, H, tree, hyperbranched copolyamide thermoplastic polymer as described above.

In one embodiment, the relative viscosity of the polyamide resin can vary from 2.0 to 3.7 (a solution of 1 g of polymer in 100 ml of 90% formic acid, measured at 25° C.). In another embodiment, the number-average molecular weight of the polyamide resin can vary from about 5000 to 70 000.

In one embodiment, the content of the polyamide resin can be selected according to the required properties. In one embodiment, the polyamide resin can be included in an amount from 1 to 98 wt. % relative to the total weight of the composition.

(b) Polyester Resin

In one embodiment, the polyester resin included in the composition of the present invention can be a polymeric compound that has ester bonds in its backbone. Examples of polyester resin can comprise a homopolymer or a copolymer that can be obtained by condensation of a dicarboxylic acid (or of its derivatives that can form an ester) with a diol (or its derivatives that can form an ester), or a mixture thereof.

In one embodiment, an example of dicarboxylic acid can comprise an aromatic dicarboxylic acid such as terephthalic acid, isophthalic acid, phthalic acid, 1,4-, 1,5-, 2,6- or 2,7-naphthalene dicarboxylic acid, bis(p-carboxyphenyl) methane, anthracene dicarboxylic acid, 4,4'-diphenyl ether carboxylic acid, 5-sodium sulfoisophthalic acid, etc.; an aliphatic dicarboxylic acid such as adipic acid, sebacic acid, azelaic acid, dodecanedioic acid, etc.; a cycloaliphatic dicarboxylic acid such as 1,3-cyclohexane dicarboxylic acid, 1,4-cyclohexane dicarboxylic acid, etc.; and derivatives thereof that can form an ester, but without being limited thereto. In certain embodiments, said dicarboxylic acid can be used in the form of a derivative that can form an ester such as a derivative substituted with an alkylalkoxy, or a halogen, etc., and an ester obtained from a lower alcohol, e.g. dimethyl ester.

In another embodiment, examples of said diols can comprise an aliphatic glycol with 2 to 20 carbon atoms such as ethylene glycol, propylene glycol, 1,4-butanediol, neopentyl glycol, 1,5-pentanediol, 1,6-hexanediol, decamethylene glycol, cyclohexanedimethanol, cyclohexanediol, etc.; a long-chain glycol with a molecular weight from 400 to 6000 such as polyethylene glycol, poly-1,3-propylene glycol, polytetramethylene glycol, etc.; and derivatives thereof that can form an ester, but without being limited thereto. In certain embodiments, said diols can be used in the form of their derivatives that can form an ester such as a derivative substituted with an alkyl group, alkoxy group or a halogen, etc.

In a certain embodiment, examples of homopolymer or copolymer of the latter can comprise polybutylene terephthalate, polybutylene (terephthalate/isophthalate), polybutylene (terephthalate/adipate), polybutylene (terephthalate/sebacate), polybutylene (terephthalate/decanedicarboxylate), polybutylene naphthalate, polyethylene terephthalate, polyethylene (terephthalate/isophthalate), polyethylene (terephthalate/adipate), polyethylene (terephthalate/5-sodium sulfoisophthalate), polybutylene (terephthalate/5-sodium sulfoisophthalate), polypropylene terephthalate, polyethylene naphthalate, polycyclohexanedimethylene terephthalate, but without being limited thereto.

In another embodiment, examples of polyester resin other than the above compounds can comprise a polyester resin copolymerized with a copolymerizable monomer, e.g. a hydroxycarboxylic acid such as glycolic acid, hydroxybenzoic acid, hydroxyphenylacetic acid, naphthylglycolic acid, etc.; and a lactone compound such as propiolactone, butyrolactone, caprolactone, valerolactone, etc. In yet another embodiment, examples of polyester resin can comprise a polyester resin derived from compounds forming a multi-functional ester such as trimethylolpropane, trimethylolethane, pentaerythritol, trimellitic acid, trimesic acid, pyromellitic acid or a polyester resin having a branched or crosslinked structure in an amount at which the polyester resin maintains thermoplasticity.

The content of polyester resin can be selected according to the required properties. In one embodiment, the polyester resin can be included in an amount from 1 to 98 wt. % relative to the total weight of the composition.

The polyester resin can notably be a recycled polyester notably obtained from articles at the end of their useful life or production wastes. These polyesters can be obtained from textile goods, bottles, films or industrial plastics, notably composites. The polyesters can be used directly or after one or more possible treatments, notably of hydrolysis or with the aim of separating the fillers and additives from the polyester compositions. The waste can for example be crushed or ground in the form of fragments, powders or granules.

It is possible, according to the invention, to use a mixture of polyester and of recycled polyester in the composition.

(c) Epoxy Resin

In one embodiment, a compound having two epoxy groups or more per molecule can be used in an epoxy resin. If an epoxy resin is added, it is possible to obtain, by chemical bonding between a polyamide and/or a polyester, a blend of resins with improved compatibility between the polyamide resin and the polyester resin.

In one embodiment, examples of the epoxy resin can comprise an epoxy resin of the DGEBA (diglycidyl ether of bisphenol A) type, an epoxy resin of the DGEBF (diglycidyl ether of bisphenol F) type, an epoxy resin of the hydrogenated BPA (hydrogenated bisphenol A) type, a brominated epoxy resin, a cycloaliphatic epoxy resin, an epoxy resin of the aliphatic polyglycidyl type, an epoxy resin of the glycidyl amine type, etc., but without being limited thereto. The epoxy resin can be used alone or as a combination of two or more types.

In one embodiment, the epoxy resin can be obtained, for example, by reaction of bisphenol A, of bisphenol F, of hydrogenated or brominated bisphenol A or bisphenol F, or of compounds having two or more hydroxyl groups with epichlorohydrin, or can be readily obtained commercially.

In one embodiment, the number of functional groups of the epoxy resin can be one or more, for example, four or more, depending on the degree of polymerization and the form of the chemical substance. The epoxy resin can be either in the form of a liquid phase or of a solid phase.

The epoxy equivalent weight can vary in the range from 2100 to 6000 g/eq, and preferably in values greater than 2200 g/eq, more preferably greater than 2300 g/eq, even more preferably greater than 2500 g/eq; notably in the range from 2200 to 6000 g/eq, in the range from 2300 to 6000 g/eq or in the range from 2500 to 6000 g/eq. When using an epoxy resin having an epoxy equivalent weight below the aforementioned range, the viscosity of the composition of the blend of resins increases, with a consequent deterioration of processability.

The epoxy equivalent weight (EEW) of a resin can be measured by various known methods. We may notably mention the standards JIS K 7236-1986, ASTM D1652-73, and ISO 3001-1978. In the case of a distribution of the epoxy equivalent weight for an epoxy resin, the average value is taken into account.

In one embodiment, the content of epoxy resin can vary from 0.01 to 10 wt. % relative to the total weight of the composition. In another embodiment, the content of epoxy resin can vary from 0.05 to 7 wt. %, or from 0.1 to 5 wt. %. If the content of epoxy resin exceeds the above ranges, for example, the viscosity of the composition of the blend of resins can increase and/or the fluidity of the composition deteriorates, with a consequent deterioration of processability and causing problems during processing. During this period, in the case when the content of epoxy resin is less than the above ranges or if no epoxy resin is used, the compatibility between the polyamide resin and the polyester resin is insufficient, and consequently the processability deteriorates and there may be a deterioration of properties such as rigidity and strength, etc.

In certain embodiments, depending on the desired final property, a composition of a blend of resins can moreover comprise other polymeric resins, for example, polyethylene, polystyrene, polypropylene, ABS resin, polycarbonate, polyphenylene sulfide, polyphenylene oxide, polyacetal, polysulfone, polyether sulfone, polyetherimide, polyether ketone, a polylactic acid resin, a polysulfone resin, an elastomer resin or mixtures thereof.

The composition can comprise fibrous and/or nonfibrous fillers.

As fibrous fillers, we may mention glass fibers, carbon fibers, natural fibers, aramid fibers, and nanotubes, notably of carbon. As natural fibers, we may mention hemp and flax. Among nonfibrous fillers we may notably mention all particulate and lamellar fillers and/or exfoliating or nonexfoliating nanofillers such as alumina, carbon black, aluminosilicate clays, montmorillonites, zirconium phosphate, kaolin, calcium carbonate, diatoms, graphite, mica, silica, titanium dioxide, zeolites, talc, wollastonite, polymeric fillers such as, for example, particles of dimethacrylates, glass beads or glass powder.

It is perfectly possible according to the invention for the composition to comprise several types of reinforcing fillers. Preferably, the filler used most can be glass fibers, of the so-called chopped type, notably having a diameter between 7 and 14 µm. These fillers can have surface oiling that ensures mechanical adhesion between the fibers and the polyamide matrix.

The concentration by weight of reinforcing fillers or simple fillers is advantageously between 1 and 60 wt. % relative to the total weight of the composition, preferably between 15 and 50 wt. %.

The composition can also comprise agents for modifying impact strength. It is generally elastomeric polymers that can be used for this purpose. Agents for modifying resilience are generally defined as having a tensile modulus ASTM D-638 less than about 500 MPa. Examples of suitable elastomers are ethylene-acrylic ester-maleic anhydride, ethylene-propylene-maleic anhydride, EPDM (ethylene-propylene-diene monomer) optionally with a grafted maleic anhydride. The concentration by weight of elastomer is advantageously between 0.1 and 30% relative to the total weight of the composition.

Agents for modifying impact strength comprising functional groups that are reactive with the polyamide are notably preferred. We may mention for example the terpolymers of ethylene, acrylic eater and glycidyl methacrylate, copolymers of ethylene and butyl ester acrylate, copolymers of ethylene, n-butyl acrylate and glycidyl methacrylate, copolymers of ethylene and maleic anhydride, styrene-maleimide copolymers grafted with maleic anhydride, styrene-ethylene-butylene-styrene copolymers modified with maleic anhydride, styrene-acrylonitrile copolymer grafted with maleic anhydrides, acrylonitrile-butadiene-styrene copolymers grafted with maleic anhydrides, and hydrogenated versions thereof. The proportion by weight of these agents in the total composition is notably between 0.1 and 40%.

In one embodiment, in a context that does not violate the objective of the present invention, additives such as antioxidants, thermal stabilizers, absorbers of UV radiation such as aromatic amines, hindered phenols, phosphorus and sulfur, etc., dispersants, dyes, pigments, surface-active agents, stripping agents, lubricants, plasticizers, agents for improving lustre, which are generally used as agents for treatment of plastics, can be used for imparting various effects.

The composition according to the present invention can notably comprise fireproofing agents generally used in the field of polyamides; i.e. compounds for decreasing the spread of flames and/or having fireproofing properties, which are well known by a person skilled in the art. These fireproofing agents are usually employed in fireproofed compositions and are notably described, for example, in U.S. Pat. Nos. 6,344,158, 6,365,071, 6,211,402 and 6,255,371, cited here as reference.

Advantageously, the composition comprises at least one fireproofing agent selected from the group comprising:
  fireproofing agents containing phosphorus, such as:
    oxides of phosphines for example triphenylphosphine oxide, tri-(3-hydroxypropyl)phosphine oxide and tri-(3-hydroxy-2-methylpropyl)phosphine oxide.
    phosphonic acids or salts thereof or phosphinic acids or salts thereof, for example salts of phosphinic acids of zinc, of magnesium, of calcium, of aluminum, or of manganese, notably the aluminum salt of diethylphosphinic acid or the zinc salt of dimethylphosphinic acid.
    cyclic phosphonates, such as cyclic diphosphate esters, for example Antiblaze 1045.
    organic phosphates, such as triphenylphosphate.
    inorganic phosphates, such as ammonium polyphosphates and sodium polyphosphates.
    red phosphorus, whether it is for example in stabilized or coated form, in powder or in the form of masterbatches.
  fireproofing agents of the type of organic nitrogen compounds, for example triazines, cyanuric and/or isocyanuric acid, melamine or its derivatives such as melamine cyanurate, melamine oxalate, phthalate, borate, sulfate, phosphate, polyphosphate and/or pyrophosphate, condensed products of melamine, such as melem, melam and melone, tris(hydroxyethyl) isocyanurate, benzoguanamine, guanidine, allantoin, and glycoluril.
  fireproofing agents containing halogenated derivatives, such as:

derivatives of bromine such as for example PBDPO (polybromodiphenyl oxides), BrPS (brominated polystyrene and polybromostyrene), poly(pentabromobenzyl acrylate), brominated indane, tetradecabromodiphenoxybenzene (Saytex 120), ethane-1,2-bis(pentabromophenyl) or Saytex 8010 from Albemarle, tetrabromobisphenol A and brominated epoxy oligomers. Among the brominated derivatives, we may notably mention polydibromostyrene such as PDBS-80 from Chemtura, brominated polystyrenes such as Saytex HP 3010 from Albemarle or PR-803P from Dead Sea Bromine Group, decabromodiphenyl ether (DBPE) or FR-1210 from Dead Sea Bromine Group, octabromodiphenyl ether (OBPE), 2,4,6-tris(2,4,6-tribromophenoxy)-1,3,5-triazine or FR-245 from Dead Sea Bromine Group, poly(pentabromobenzyl acrylate) or FR-1025 from Dead Sea Bromine Group and oligomers or polymers with epoxy end groups of tetrabromobisphenol-A such as F-2300 and F2400 from Dead Sea Bromine Group.

chlorinated compounds, for example a chlorinated cycloaliphatic compound such as Dechlorane Plus® (sold by OxyChem, see CAS 13560-89-9).

These compounds can be used alone or in combination, sometimes synergistic. A synergistic combination of compounds containing phosphorus is notably preferred, such as oxides of phosphines, phosphonic acids or salts thereof or phosphinic acids or salts thereof, and cyclic phosphonates; with nitrogen-containing derivatives such as melam, melem, melamine phosphate, melamine polyphosphates, melamine pyrophosphates or ammonium polyphosphates.

The composition can comprise from 1 to 40 wt. % of fireproofing agents, relative to the total weight of the composition.

In one embodiment, the composition of the resin blend of polyamide resin and of polyester resin can be obtained by mixing the components in the molten state by means of a conventional extruder, for example a single-screw extruder or a twin-screw extruder, etc. A general range for the temperature of the barrel inside the extruder can be adjusted taking into account the melting point of the resin. In an illustrative embodiment, when a resin of polyamide-6 is used, the temperature can be set at 250° C., and when a resin of polyamide-66 is used, the temperature can be set at 280° C. Moreover, the resin blend composition of the present application can be processed into desired forms such as a pellet, a flat product, a fiber, a strand, a film, a sheet, a pipe, a hollow body, a box, etc., by processing techniques such as conventional calandering, compression molding, blow-molding, injection molding, fusion molding, etc., but the forms or methods of treatment are not limited to these.

The composition according to the present invention can be used according to the general use of a polyamide resin or of a polyester resin. For example, it can be applied in various ways to general accessories of precision machinery, to automobile accessories, to electrical-electronic accessories, to materials of construction, to films, to fibers, to sports equipment, etc.

Examples described below provide further explanation of the characteristics and advantages of the object disclosed herein, but they are not limited to the examples presented below. The object disclosed herein must not be limited to the specific embodiment and to the examples described here. In light of the present disclosure, a person skilled in the art can easily perceive that it is possible to modify, substitute, add and combine a portion of the compositions described in the present disclosure other than the various illustrative embodiments and examples.

EXPERIMENTAL SECTION

In the following examples and comparative examples, the resin blend composition of the present invention and the comparative composition are prepared, respectively, and their tensile strength, their elongation in tension, their processability, etc., are then compared, on the basis of which the superior effects of the resin blend composition of polyamide resin and polyester resin of the present invention are described in detail.

Initially, each component used in the examples and comparative examples of the present invention are classified and explained below, and they are indicated with reference symbols.

<Thermoplastic Polyamide Resin>
A-1: Polyamide-66 thermoplastic resin {trade name: Technyl 23A, manufactured by Rhodia}.
A-2: Polyamide-6 thermoplastic resin {trade name: Toplamide 1011, manufactured by Hyosung}.
<Thermoplastic Polyester Resin>
B-1: Polyethylene terephthalate resin {trade name: ESLON PET-2211, manufactured by Woongjin Chemical}.
B-2: Polybutylene terephthalate resin {trade name: TRIBIT 1500 NA, manufactured by Samyang Corporation}.
B-3: Polyethylene terephthalate resin recycled from bottles.
<Epoxy Resin>
C-1: Epoxy resin of the DGEBA type {epoxy equivalent weight: 3000 g/eq}, manufactured by Kykdo Chemical, Co., Ltd.
C-2: Epoxy resin of the DGEBA type {epoxy equivalent weight: 500 g/eq}, manufactured by Kykdo Chemical, Co., Ltd.
C-3: Ethylene resin grafted with a glycidyl methacrylate group. Trade name: Lotarder A8900, manufactured by Arkema.
C-4: Epoxy resin of the DGEBA type {epoxy equivalent weight: 2000 g/eq}

Examples 1 to 8 and Comparative Examples 1 to 9

In an illustrative embodiment, the components selected above are mixed uniformly in a super-mixer according to each mixture ratio of the examples and comparative examples. A twin-screw extruder (inside diameter 30 mm, L/D=30) is used. The temperatures of the barrel inside the extruder are set to about 250° C. when the polyamide-6 resin is used, and to about 280° C. when the polyamide-66 resin is used, taking into account the melting point of the resin used, and the gas within the screws is exhausted at a rotary speed of the screws from 250 to 300 rev/min and a vacuum pump pressure from 50 to 70 cm Hg. The components are perfectly mixed inside the extruder barrel and the strand formed is cooled rapidly in a bath of cold water and pelletized at a specified a size using a pelleter.

An injection molding machine (German, ENGEL) having a closing force of 80 tonnes and an injection volume of 189.44 cc (6.4 oz) is used for preparing samples for the various tests of properties. After preparing the sample of the composition by molding in conditions of a molding temperature in the general range taking account of the melting point of the resin used, a molding temperature of 80° C., an injection pressure from 50 to 80 bar, an injection speed from 40 to 60 mm/s, an injection time of three seconds and a cooling time of fifteen seconds.

The overall properties are measured by the following methods, and the results are presented in Tables 1-3 below.

The elements to be analyzed and the methods of analysis are as follows.

Tensile strength: The tensile strength is measured using an Instron tester according to the method of analysis ASTM D-638. The unit of measurement of tensile strength is kgf/cm².

Elongation in tension: The tensile elastic modulus is measured using an Instron tester according to the method of analysis ASTM D-638. The unit of measurement of elongation in tension is %.

Peeling: The sample prepared according to method ASTM D-638 is folded several times and it is examined to check for any peeling at the point of folding.

The standard is shown below:

```
No peeling ----------------------- Considerable peeling
   5         4         3         2         1
```

Processability: The degree of swelling of the strand at extruder outlet is observed. The standard is shown below:

```
No swelling ---------------------- Considerable swelling
   5         4         3         2         1
```

TABLE 1

| Component (wt. %) | Example 1 | Example 2 | Example 3 | Example 4 | Example 5 | Example 6 |
|---|---|---|---|---|---|---|
| A-1 | 57 | 57 | 40 | | | 59.7 |
| A-2 | | | | 57 | 40 | |
| B-1 | 40 | | 57 | | | 40 |
| B-2 | | 40 | | 40 | 57 | |
| C-1 | 3 | 3 | 3 | 3 | 3 | 0.3 |
| Tensile strength (MPa) | 80 | 79 | 71 | 67 | 56 | 79 |
| Elongation in tension (%) | 120 | 70 | 90 | 130 | 100 | 30 |
| Peeling | 5 | 5 | 5 | 5 | 5 | 5 |
| Swelling | 5 | 5 | 5 | 5 | 5 | 5 |

TABLE 2

| Component (wt. %) | Comp. Example 1 | Comp. Example 2 | Comp. Example 3 | Comp. Example 4 | Comp. Example 5 | Comp. Example 6 |
|---|---|---|---|---|---|---|
| A-1 | 50 | 57 | 57 | 57 | 50 | 60 |
| A-2 | | | | | | |
| B-1 | 35 | | 40 | 40 | 40 | 40 |
| B-2 | | 40 | | | | |
| C-1 | 15 | | | | | |
| C-2 | | 3 | 0.3 | | | |
| C-3 | | | | 3 | 10 | |
| * Tensile strength (MPa) | — | — | 70 | — | 46 | — |
| * Elongation in tension (%) | — | — | 10 | — | 3 | — |
| * Peeling | — | — | 4 | — | 3 | — |
| * Swelling | 1 | 1 | 3 | 2 | 3 | 1 |

TABLE 3

| Component (wt. %) | Example 7 | Example 8 | Example 8 | Comp. Example 7 | Comp. Example 8 | Comp. Example 9 |
|---|---|---|---|---|---|---|
| A-1 | 58.5 | 57.3 | 56.1 | 58.5 | 57.3 | 56.1 |
| B-1 | 38 | 38.2 | 37.4 | 38 | 38.2 | 37.4 |
| C-1 | 2 | 4 | 6 | — | — | — |
| C-4 | | | | 2 | 4 | 6 |
| Elongation in tension (%) | 51.9 | 66.2 | 62.2 | 4.7 | 11.5 | 14.3 |

Based on the above Tables 1-3, it can be confirmed that compatibility was improved on adding an epoxy resin to a composition of a blend of polyamide resins 6 or of polyamide 66 and of polyethylene terephthalate or of polybutylene terephthalate without any compatibility. In the case of considerable swelling at extruder outlet through lack of compatibility (comparative example 4, comparative example 6), the properties and peeling could not be evaluated, as no pellet could be obtained.

In the case when a large amount of epoxy resin is added (comparative example 1), the viscosity of the resin blend composition is too high and processability is therefore found to be poor. The composition obtained by adding an epoxy resin having a low epoxy equivalent weight displays considerable swelling at extruder outlet and therefore the properties and peeling cannot be evaluated, as no pellet can be obtained (comparative example 2), or the processability and properties are lower compared with the composition of resins that uses epoxy resin presented in the present invention (comparative example 3).

In the case when compatibility is obtained by using an ethylene resin grafted with a glycidyl methacrylate group known in the prior art (comparative example 5), the rigidity, resistance and processability are all insufficient.

Examples 9 to 11

For producing compositions comprising recycled polyesters, the protocol is the same as mentioned above. The components selected above are employed according to each mixture ratio of the examples and are presented in the following table, with the properties indicated.

TABLE 4

| Component (wt. %) | Example 9 | Example 10 | Example 11 |
|---|---|---|---|
| A-1 | 58.8 | 58.8 | 58.8 |
| B-1 | 39.2 | 19.6 | — |
| B-3 | — | 19.6 | 29.2 |
| C-1 | 1.5 | 1.5 | 1.5 |
| Tensile strength | 788.1 | 783.4 | 797.9 |
| Bending modulus ASTM D790 (kgf/cm²) | 29 440 | 28 750 | 30 120 |
| IZOD impact ASTM D256 (kgf/cm/cm) | 4.34 | 4.01 | 4.20 |

Mechanical properties that are equivalent and satisfactory are observed for the various formulations according to the invention.

Example 12 and Comparative Example 12

For the production of fireproofed compositions, the protocol is the same as mentioned above. The components are employed according to each mixture ratio of the examples and are presented in the following table, with the properties indicated.

TABLE 5

| Component (wt. %) | Example 12 | Comparative example 12 |
|---|---|---|
| A-1 | 34.08 | 51.2 |
| B-1 | 22.72 | — |
| C-1 | 0.6 | — |
| Glass fibers | 30 | 30 |
| With organophosphorus | 8.1 | 11.6 |
| MPP | 4.1 | 5.8 |
| GWIT, 2 mm (° C.) | 775 | 775 |
| GWFI, 2 mm (° C.) | 960 | 960 |
| UL 94 0.8 mm | V0 | V0 |
| Tensile strength (MPa) | 137.9 | 133.7 |

The organophosphorus compound is Exolit OP1230 from the company Clariant. MPP is melamine polyphosphate.

It can thus be seen that a blend according to the present invention makes it possible to obtain quite remarkable fireproofing properties, while using a smaller amount (30% reduction) of fireproofing agents in the formulation.

Example 13 and Comparative Example 13

For producing fireproofed compositions, the protocol is the same as mentioned above. The components are employed according to each mixture ratio of the examples and are presented in the following table, with the properties indicated.

TABLE 6

| Component (wt. %) | Example 12 | Comparative example 12 |
|---|---|---|
| A-1 | 47 | 51.2 |
| B-1 | 20 | — |
| C-1 | 1 | — |
| Glass fibers | 25 | 25 |
| Red phosphorus | 6.6 | 11 |
| GWIT, 775° C., 1 mm | Pass | Pass |
| GWIT, 775° C., 2 mm | Pass | Fail |
| GWFI, 960° C., 1 mm | Pass | Pass |
| GWFI, 960° C., 2 mm | Pass | Pass |
| UL 94 0.8 mm | V0 | V0 |
| CTI (V) | 450 | 425 |
| Tensile strength (MPa) | 167 | 167 |
| Elongation at rupture (%) | 3.1 | 3.1 |

The red phosphorus is RPM 460 FerroFlam.

It can thus be seen that a blend according to the present invention makes it possible to obtain quite remarkable fireproofing properties while using a smaller amount (40% reduction) of fireproofing agents in the formulation.

Advantageous Effect

A composition of a blend of resins with remarkably improved compatibility can be obtained by adding a specific epoxy resin to a blend of a polyamide resin and of a polyester resin, which are well known for having no compatibility. The blend of resins with improved compatibility can have excellent properties such as mechanical properties (strength properties, bending strength, elasticity, abrasion resistance, impact strength), chemical properties (resistance to solvents), heat resistance, dimensional stability, combability, etc.

Based on the foregoing, it will be understood that various embodiments of the present disclosure have been described here for purposes of illustration and that various modifications can be made without departing from the spirit and scope of the present disclosure. Accordingly, the various embodiments described here are not intended to be limiting, the spirit and the real scope being indicated by the following claims.

The invention claimed is:

1. A resin blend composition of a polyamide resin and of a polyester resin, the composition comprising:
   a) from 1 wt. % to 98 wt. % of a thermoplastic polyamide resin;
   b) from 1 wt. % to 98 wt. % of a thermoplastic polyester resin comprising a homopolymer or a copolymer that is obtained by condensation of a dicarboxylic acid or its derivatives that can form an ester, with a diol or its derivatives that can form an ester, or a mixture thereof, wherein the thermoplastic polyester resin comprises at least one $C_2$-$C_{20}$ aliphatic glycol as the diol monomer;
   c) from 0.01 wt. % to 10 wt. % of an epoxy resin having an epoxy equivalent weight (EEW) ranging from 2100 g/eq and 6000 g/eq; and
   d) from 1 wt. % to 40 wt. % of a red phosphorus fireproofing agent,
   wherein the weight percentages are based on the total weight of the composition.

2. The composition as claimed in claim 1 comprising 5.5 wt. % to 20 wt. % of the fireproofing agent.

3. The composition as claimed in claim 1, wherein said epoxy resin comprises one or more elements selected from the group consisting of a diglycidyl ether of bisphenol A (DGEBA) epoxy resin, a diglycidyl ether of bisphenol F (DGEBF) epoxy resin, a hydrogenated bisphenol A (BPA) epoxy resin, a brominated epoxy resin, a cycloaliphatic epoxy resin, an epoxy resin of modified rubber, an aliphatic polyglycidyl epoxy resin, and a glycidyl amine epoxy resin.

4. The composition as claimed in claim 1, wherein the epoxy equivalent weight of said epoxy resin ranges from 2500 g/eq to 6000 g/eq.

5. The composition as claimed in claim 1, wherein said composition comprises from 0.05 wt. % to 7 wt. % of said epoxy resin.

6. The composition as claimed in claim 1, wherein said polyamide resin comprises one or more elements selected from the group consisting of polyamide-6, polyamide-66, polyamide-610, polyamide-11, polyamide-12, polyterephthalamide, polyisophthalamide, and polyaramids.

7. The composition as claimed in claim 1, wherein said polyester resin comprises one or more elements selected from the group consisting of polybutylene terephthalate, polybutylene (terephthalate/isophthalate), polybutylene (terephthalate/adipate), polybutylene (terephthalate/sebacate), polybutylene (terephthalate/decanedicarboxylate), polybutylene naphthalate, polyethylene terephthalate, polyethylene (terephthalate/isophthalate), polyethylene (terephthalate/adipate), polyethylene (terephthalate/5-sodium sulfoisophthalate), polybutylene (terephthalate/5-sodium sulfoisophthalate), polypropylene terephthalate, polyethylene naphthalate, and polycyclohexanedimethylene terephthalate.

8. The composition as claimed in claim 1, wherein said polyester resin is a recycled resin.

9. The composition as claimed in claim 1, wherein the $C_2$-$C_{20}$ aliphatic glycol is selected from the group consisting of ethylene glycol, propylene glycol, 1,4-butanediol, neopentyl glycol, 1,5-pentanediol, 1,6-hexanediol, decamethylene glycol, cyclohexanedimethanol, and cyclohexanediol.

10. The composition as claimed in claim 1, wherein the dicarboxylic acid is an aromatic dicarboxylic acid selected from the group consisting of terephthalic acid, isophthalic acid, phthalic acid, 1,4-naphthalene dicarboxylic acid, 1,5-naphthalene dicarboxylic acid, 2,6-naphthalene dicarboxylic acid, 2,7-naphthalene dicarboxylic acid, bis(p-carboxyphenyl)methane, anthracene dicarboxylic acid, 4,4'-diphenyl ether dicarboxylic acid, and 5-sodium sulfoisophthalic acid.

11. A method of preparing a resin blend composition of a polyamide resin and of a polyester resin, the method comprising mixing in the molten state:
   a) from 1 wt. % to 98 wt. % of a thermoplastic polyamide resin;
   b) from 1 wt. % to 98 wt. % of a thermoplastic polyester resin comprising a homopolymer or a copolymer that is obtained by condensation of a dicarboxylic acid or its derivatives that can form an ester, with a diol or its derivatives that can form an ester, or a mixture thereof, wherein the thermoplastic polyester resin obtained by condensation of at least one $C_2$-$C_{20}$ aliphatic glycol as the diol monomer;
   c) from 0.01 wt. % to 10 wt. % of an epoxy resin having an epoxy equivalent weight ranging from 2100 g/eq and 6000 g/eq; and
   d) from 1 wt. % to 40 wt. % of a red phosphorus fireproofing agent,
wherein the weight percentages are based on the total weight of the composition.

12. The method of claim 11 comprising 5.5 wt. % to 20 wt. % of the fireproofing agent.

13. The method of claim 11, wherein the $C_2$-$C_{20}$ aliphatic glycol is selected from the group consisting of ethylene glycol, propylene glycol, 1,4-butanediol, neopentyl glycol, 1,5-pentanediol, 1,6-hexanediol, decamethylene glycol, cyclohexanedimethanol, and cyclohexanediol.

14. The method of claim 11, wherein the dicarboxylic acid is an aromatic dicarboxylic acid selected from the group consisting of terephthalic acid, isophthalic acid, phthalic acid, 1,4-naphthalene dicarboxylic acid, 1,5-naphthalene dicarboxylic acid, 2,6-naphthalene dicarboxylic acid, 2,7-naphthalene dicarboxylic acid, bis(p-carboxyphenyl)methane, anthracene dicarboxylic acid, 4,4'-diphenyl ether dicarboxylic acid, and 5-sodium sulfoisophthalic acid.

15. A method of improving compatibility of a resin blend composition comprising a thermoplastic polyamide resin, a thermoplastic polyester resin, and a red phosphorus fireproofing agent, the method comprising adding an epoxy resin having an epoxy equivalent weight ranging from 2100 g/eq and 6000 g/eq to improve the compatibility of the resin blend composition.

16. A resin blend composition of a polyamide resin and of a polyester resin, the composition comprising:
   a) from 1 wt. % to 98 wt. % of a thermoplastic polyamide resin selected from polyamide-6, polyamide-66, polyamide-66/6, and mixtures thereof;
   b) from 1 wt. % to 98 wt. % of a thermoplastic polyester resin selected from polybutylene terephthalate, polyethylene terephthalate, and mixtures thereof;
   c) from 0.1 wt. % to 5 wt. % of an epoxy resin selected from a diglycidyl ether of bisphenol A (DGEBA) having an epoxy equivalent weight (EEW) ranging from 2100 g/eq and 6000 g/eq; and
   d) from 1 wt. % to 40 wt. % of a red phosphorus fireproofing agent,
wherein the weight percentages are based on the total weight of the composition.

17. The composition as claimed in claim 16 comprising 5.5 wt. % to 20 wt. % of the fireproofing agent.

* * * * *